United States Patent
Cherek et al.

Patent Number: 5,943,294
Date of Patent: Aug. 24, 1999

[54] LEVEL DETECTOR FOR FLUENT MATERIAL

[75] Inventors: Bogdan Cherek, Peterborough; Stanislaw Bleszynski, Lakefield, both of Canada

[73] Assignee: Milltronics Ltd., Peterborough, Canada

[21] Appl. No.: 09/070,727

[22] Filed: May 1, 1998

Related U.S. Application Data

[63] Continuation-in-part of application No. 08/841,991, Apr. 8, 1997, Pat. No. 5,748,562.

[51] Int. Cl.$^6$ .................................................. G01S 15/02
[52] U.S. Cl. ............................................. 367/98; 367/908
[58] Field of Search .................. 367/908, 98; 73/290 V; 340/621

[56] References Cited

U.S. PATENT DOCUMENTS

| | | | |
|---|---|---|---|
| 4,540,981 | 9/1985 | Lapetina . | |
| 4,831,565 | 5/1989 | Woodward . | |
| 5,748,562 | 5/1998 | Cherek et al. | 367/908 |
| 5,836,192 | 11/1998 | Getman et al. | 367/908 |

FOREIGN PATENT DOCUMENTS

| | | |
|---|---|---|
| 2150292 | 6/1985 | United Kingdom . |
| 2306003 | 4/1997 | United Kingdom . |

Primary Examiner—Daniel T. Pihulic
Attorney, Agent, or Firm—Ridout & Maybee

[57] ABSTRACT

A vibrating probe for detecting a threshold level within a vessel of fluent material, particularly a liquid, includes: an ultrasonic acoustic transducer assembly comprising a transducer element having a natural resonant frequency, and loading elements effective to shift that frequency to an effective resonant frequency of the assembly, the assembly being supported within the vessel and including a coupling member to couple the transducer acoustically to liquid reaching the threshold level, a transmitter generating pulses applied to the transducer element for repeatedly exciting the transducer element to cause the transducer assembly to resonate at its effective resonant frequency, a circuit for measuring the effective resonant frequency of the transducer over a ringdown period following cessation of each pulse, and a circuit for comparing the effective resonant frequency measured during the ringdown period following each pulse with a predetermined threshold level. The threshold level is selected so as to distinguish between the effective resonant frequency of the assembly in free air and a lower effective resonant frequency when coupled to fluent material through the coupling member. The damping effect of the fluent material, particularly if a viscous liquid, may accelerate the ringdown to an extent such that vibration is effectively suppressed before the end of the frequency measurement, thus further depressing the apparent measured frequency.

3 Claims, 1 Drawing Sheet

LEVEL DETECTOR FOR FLUENT MATERIAL

REFERENCE TO RELATED APPLICATION

This application is a continuation-in-part of our application Ser. No. 08/841,991 filed Apr. 8, 1997, now U.S. Pat. No. 5,748,562.

FIELD OF THE INVENTION

This invention relates to level detectors for fluent materials of the type in which a vibrating probe is located within a vessel, such that when the level of material in the vessel rises to submerge the probe, the vibratory behaviour of the probe is modified in a detectable manner, thus signalling that a threshold level has been reached.

BACKGROUND OF THE INVENTION

Numerous such detectors have been developed of which DE 4203967 A1 (Endress & Hauser) is but an example, but because of the widely varying characteristics of materials to be detected, none has proved entirely satisfactory under all circumstances. Some designs employ forked probes, which can fail to function properly if lumps of the solid to be detected become stuck in the fork. Others, using concentric or single probes, can fail to function reliably if adherent materials or dust or other deposits from the materials build up excessively on the probe assembly. The vibration of the probe can in some cases cause a cavity to form in solid materials around the probe, thus giving a false indication. Careful design is necessary to prevent vibration from the probe being coupled excessively and unpredictably through the walls of the vessel in which the probe is mounted, possibly giving rise to unreliable operation.

In U.S. Pat. No. 4,841,565 (Woodward), assigned to the present applicant, it is disclosed that in an acoustic pulse-echo ranging system, the amplitude of ringing of an acoustic transducer may be sampled a predetermined time after application of a burst of high-frequency electrical energy to the transducer and compared with a threshold value in order to determine whether the transducer is present and operative. In U.S. Pat. No. 4,540,981 (Lapetina), a somewhat similar principle is utilized to determining whether a probe or diaphragm is submerged in liquid. The probe is located within a pipe into which the liquid flows, and is excited from outside of the container being monitored. The ringing o the probe or diaphragm is more heavily damped in the presence of liquid, and this can be detected.

U.S. Pat. No. 5,578,994 of B. Cherek and J. E. Gillis describes a vibrating-fork type level sensor for liquids where the transducer is connected in a feed-back loop of a Butler oscillator operating in a continuous (non-pulsed) mode. A liquid immersion of the sensor shifts or suppresses the dominant frequency mode and reduces its Q-factor causing the oscillator to shut down.

When solids are being sensed, changes in damping applied to a vibratory member may be less marked, depending on the nature of the solid, and thus more difficult to detect.

British Patent Application 2,306,003A, of the present applicant, discloses a vibrating element driven by a transducer, and utilized for sensing the presence of solid materials in contact with the probe, the probe being energized by successive bursts of energy, reduction of the decay time of the vibration envelope of the bursts being indicative of the probe's immersion.

SUMMARY OF THE INVENTION

It is an object of the present invention to provide a level detector of the type discussed above which addresses problems encountered with such detectors, and which can provide reliable operation in a range of fluent materials, particularly liquids.

According to the invention, there is provided a vibrating probe for detecting a threshold level of fluent material, particularly a liquid, within a vessel, comprising an ultrasonic acoustic transducer assembly comprising a transducer element having a natural resonant frequency, and loading elements effective to shift that frequency to an effective resonant frequency, the assembly being supported within the vessel and including a coupling member to couple the transducer acoustically to liquid reaching the threshold level; a transmitter generating pulses applied to the transducer element for repeatedly exciting the transducer element to cause the transducer assembly to resonate at its effective resonant frequency, a circuit for measuring the effective resonant frequency of the transducer over a ringdown period after cessation of each pulse, and a circuit for comparing the measured effective resonant frequency during the ringdown period following each pulse with a predetermined threshold level. The threshold level is selected so as to distinguish between the effective resonant frequency of the assembly in free air and its lower effective resonant frequency when coupled to fluent material. The damping effect of the fluent material, particularly if a viscous liquid, may accelerate the ringdown to an extent such that vibration is effectively suppressed before the end of the frequency measurement, thus further depressing the apparent measured frequency.

In a preferred arrangement, the zero crossings of the transducer output during the ringdown period are detected and counted and the number obtained is compared with a threshold above which it is considered to represent the effective resonant frequency of the transducer assembly in free air.

SHORT DESCRIPTION OF THE DRAWINGS

DESCRIPTION OF THE PREFERRED EMBODIMENT

Figure 1:
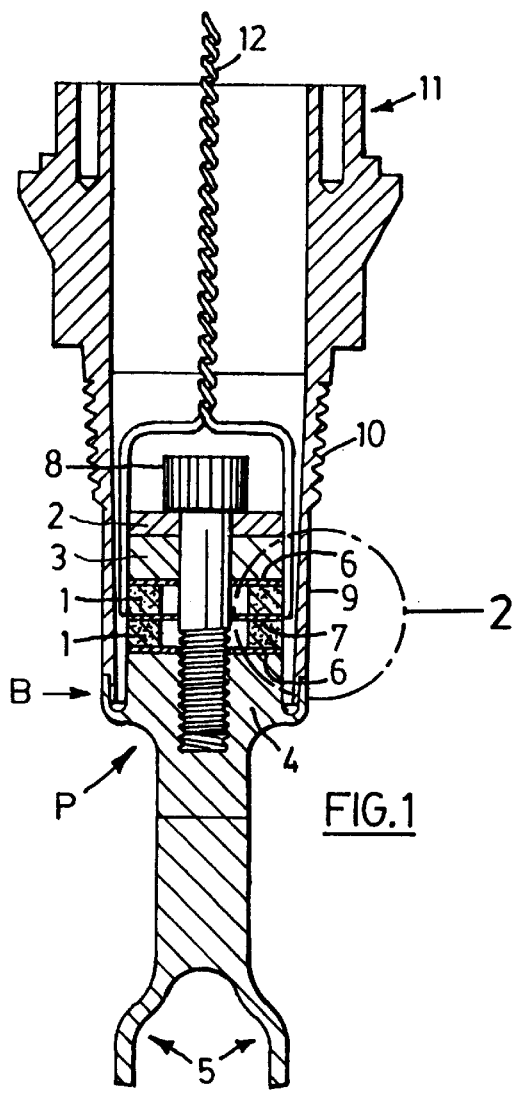
FIG. 1 is a vertical section through an example of a suitable acoustic transducer and coupling member for use in implementing the invention.

A piezoelectric transducer assembly will typically have a number of possible modes of vibration, of which one will be dominant. The assembly P of FIG. 1 is designed so that its dominant frequency mode of operation is a third or higher flexural mode. The assembly includes a piezoelectric element, typically formed by disks 1 of piezoelectric material such as lead zirconate (PZT), sandwiched between contact disks 6 and 7 and clamped between loading blocks 2, 3 and a fork element 4 by means of a screw 8 threaded into the fork 4 and pressing the blocks 2 and 3 against the piezoelectric elements 1 through the contact washers 6 and 7. The fork element 4 has a column extending vertically downward below the elements 1 to terminate in a tuning fork 5, the column being of sufficiently restricted dimensions that it provides little coupling between the device and ambient air. The fork 5 is tuned to have a fundamental or higher plexural mode resonant frequency in free air somewhat lower than the resonance frequency of the piezoelectric elements. Typically, the elements of the device may be chosen and dimensioned so that the assembly will have a dominant resonance mode in air at a frequency in the range 20 to 50 kHz, for example 24 kHz. The transducer elements 1 may have a natural resonance frequency of for example 28 kHz which is translated to an effective resonance frequence of 24 kHz in free air by the loading imposed by the parts 2, 3, 4 and 5.

Advantageously, the loading block 3, and the column 4 and tuning fork 5, or at least the loading block 3, are formed of a metal such as aluminum having a comparatively high coefficient of expansion, such that thermal expansion of the block 3 varies the pressure applied by the screw 8 and compensates for the frequency shift with temperature characteristic of piezoelectric transducer elements. Preferably also the assembly is mounted to a thin walled tubular housing 9 at a nodal point B such as to minimize transmission of acoustic energy to the housing and thus to structure to which the housing is mounted.

The piezoelectric device need not have the structure shown, but must be such that contact of a fork or other coupling member with a fluent material whose level is being monitored will substantially increase the loading on the assembly and thus shift the dominant frequency of resonance of the assembly. Particularly in viscous liquids or fluent solids, the damping applied to the coupling member will rapidly tend to suppress or greatly reduce the amplitude of ringing of the assembly. With the arrangement shown, contact with a liquid will result in a downward shift of the effective resonant frequency of the assembly. A viscous liquid may result in a vibration antinode at or near the fork 5 being replaced by a node at or near that location. Under these circumstances the conditions for sustained ringing near the frequency of excitation can no longer be satisfied, and the Q of the assembly will drop dramatically. The fork 5 may be replaced by other forms of element providing effective coupling to the liquid being monitored, but its use helps translate the acoustic energy from the elements to the effective resonant frequency of the assembly, and accentuates the results of the change caused by contact with fluent material. Different piezoelectric device structures could be utilized, provided that contact of material with a lowest point thereof can be relied upon to cause a frequency shift of the effective resonant frequency of the assembly excitation frequency applied, and/or a dramatic decrease of the Q of the assembly.

The terminals 6 and 7 are connected to a cable 12, and the assembly is supported through the thin-walled tubular housing 9 which may be provided with alternative mountings 10 and 11.

Figure 2:
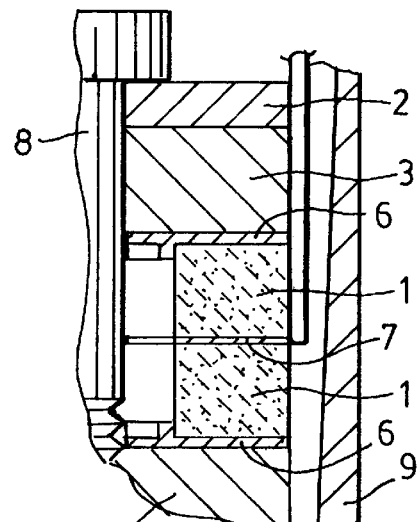
FIG. 2 is a fragmentary enlargement of a portion of FIG. 1.
Figure 3:
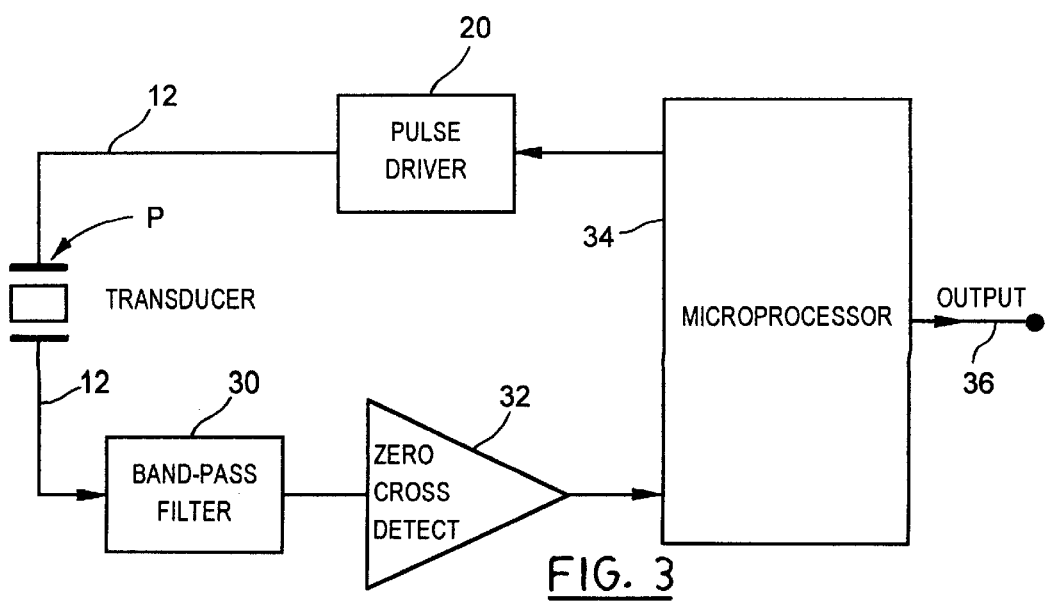
FIG. 3 is a schematic block diagram of an electronic circuit utilized in conjunction with the transducer.

Referring now to FIG. 2, the terminals 6 and 7 of transducer P are connected by the cable 12 both to a transmitter in the form of a pulse driver 20 and to a receiver comprising a bandpass filter 30. The transmitter and receiver may be similar to those conventionally used in ultrasonic pulse-echo ranging equipment. Thus the transmitter can be triggered to generate high amplitude pulses which are applied to the transducer through the cable 12. Typically these pulses, for application to a piezoelectric transducer such as that described above, may have a rise time of about 5 microseconds and an amplitude of about 80 volts. It is preferred in this application to energize the transducer elements by a transient pulse rather than a burst of high frequency energy, since this avoids the frequency of the burst influencing the effective resonant frequency of the assembly. The pulses excite the fork of the transducer assembly at effective resonant frequency of the assembly in free air, in this example about 24 kHz. The frequency offset between the natural frequency of the elements and the effective frequency of the assembly tailors the ringing characteristics of the transducer in free air to a desired profile. The pulse amplitude may be made high enough to ensure that the fork 5 is self-cleaning under anticipated conditions of operation, and the transducer should accordingly be designed to handle such pulses without damage. A third order flexural mode resonance at 24 kHz may be achieved with fork blades about 2 cm long and 2.5 mm thick.

The receiver includes an input circuit, typically consisting of a high value resistor and clipping diodes, designed to protect the receiver circuit from the high amplitude bursts from the transducer, and an impedance matching bandpass amplifier applying signals from the cable 12 to a zero crossing detector 32 to provide a digital output signal. During a ringdown period following the end of each transmitter burst, the signal in the cable will represent ringing of the transducer assembly, which in free air has a high Q or quality factor. The output of the receiver thus includes a portion following cessation of each burst which represents the amplitude of ringing of the transmitter. As long as the amplitude of this signal is above a threshold level, the zero crossing detector will convert it into a train of digital pulses.

The pulse train generated during the ringdown period is applied to a microprocessor 34, which includes a counter function and is programmed to count the pulses over a predetermined ringdown period following the termination of each transmitter pulse, and compare the count obtained with a predetermined threshold count selected to correspond to the lower limit of frequency consistent with the fork 5 not being in contact with fluent material. This lower limit may be selected to allow for a limited accretion of material on the fork 5, thus addressing a problem occurring with many liquid level detectors whose operation may be disturbed by the retention of material, particularly viscous liquids, on sensing elements, even though the latter are not submerged. The acoustic pulses applied to the fork 5 also tend to discourage such retention.

According to whether the count obtained is above or below the threshold, the microprocessor will provide an output 36 indicating whether the fork 5 is or is not in contact with the fluent material. The microprocessor also generates signals to activate the pulse driver 20 at intervals that are large compared with the duration of the pulses applied to the transducer assembly, such as to allow adequate time between each transmitter pulse for the pulse train for the receiver to be counted during the ringdown period. The length of the count should be long enough to enable the effective frequency to be determined with adequate resolution, but not so long that the ringing of the transducer assembly in free air will decay to a level insufficient to operate the zero crossing detector before the end of the count. In practice, the cycle should be completed in the example described in a time such as to permit a pulse repetition frequency of about 50 ms.

When the assembly P is mounted by the housing 9 in a vessel containing a fluent material, and the surface of the material contacts the fork 5, the vibration of the fork and vibration antinode at or near the fork will be influenced. With a relatively low density, low viscosity liquid, the effective resonant frequency will be reduced. With a viscous and or dense liquid or fluent solid, the normal vibration mode of the assembly may be suppressed because of interaction with the solid particles, thus limiting or destroying the ability of the assembly to sustain vibration in its normal resonant mode in free air. As a result, such vibration will become very heavily damped, dramatically lowering the Q of the assembly, although the extent and rapidity of this effect will depend on the nature and density of the material. Failure to sustain the normal dominant mode of vibration will result in the zero-crossing detector ceasing to generate pulses, thus truncating the count and providing the effect of a dramatic drop in frequency. The overall effect is that the system described will produce a count representing a readily detected drop in effective resonant frequency for a wide range of fluent materials. Typically, the frequency count in contact with a liquid will be 7% to 10% less than that in free air for typical liquids with more dramatic drops if ringing is prematurely suppressed by a very viscous liquid.

Rather than simply comparing the frequency count obtained with a threshold, the system may also directly detect when the pulse train from the zero-crossing detector is truncated, and use this as a secondary threshold similar to that used in British Application No. 2306003A, i.e. it also detects whether the ringing amplitude has dropped below the detection threshold before the end of the count period. Whichever way a premature end of ringdown is detected, the combination of the two tests provides enhanced reliability of detection over a range of materials.

We claim:

1. A vibratory probe for detecting a threshold level of fluent material within a vessel, comprising an ultrasonic acoustic transducer assembly having an effective resonant frequency, a structure for supporting the assembly from above within the vessel, the assembly including a depending coupling member disposed to depend into and to couple the transducer acoustically to fluent material at the threshold level, a transmitter for applying repeated pulses to the transducer to cause it to resonate at said effective resonant frequency, a receiver coupled determines whether a ring down characteristics of transducer assembly has been altered beyond a predetermined threshold.

2. A vibratory probe for detecting a threshold level of fluent material, particularly a liquid, within a vessel comprising of an ultrasonic acoustic transducer assembly having a transducer element having a natural resonant frequency, and loading elements effective to shift that frequency to an effective resonant frequency the assembly being supported within the vessel and including a coupling member to couple the transducer acoustically to liquid reaching the threshold level, a transmitter generating pulse applied to the transducer element for repeatedly exciting the transducer element to cause the transducer assembly to resonate at its effective resonant frequency, a circuit for counting the effective resonant frequency of the transducer over a ringdown period after cessation of each pulse, and a circuit for comparing the effective resonant frequency counted during the ringdown period following each pulse with a predetermined frequency.

3. A vibratory probe according to claim 2, wherein the counting circuit is operative only while the amplitude of the ringdown is above a predetermined amplitude, whereby a rapid ringdown below the predetermined amplitude truncates the count.

* * * * *